US009670823B2

(12) United States Patent
Hayman et al.

(10) Patent No.: US 9,670,823 B2
(45) Date of Patent: Jun. 6, 2017

(54) ENGINE WITH A TURBOCHARGER COOLING MODULE

(71) Applicant: GM GLOBAL TECHNOLOGY OPERATIONS LLC, Detroit, MI (US)

(72) Inventors: Alan W. Hayman, Romeo, MI (US); Robert S. McAlpine, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 14/666,697

(22) Filed: Mar. 24, 2015

(65) Prior Publication Data

US 2016/0281582 A1  Sep. 29, 2016

(51) Int. Cl.
| | | |
|---|---|---|
| *B60K 13/04* | (2006.01) | |
| *F01P 3/02* | (2006.01) | |
| *F02F 1/36* | (2006.01) | |
| *B60K 11/02* | (2006.01) | |
| *B60K 13/02* | (2006.01) | |
| *F01N 3/04* | (2006.01) | |

(52) U.S. Cl.
CPC ............. *F01P 3/02* (2013.01); *B60K 11/02* (2013.01); *B60K 13/02* (2013.01); *B60K 13/04* (2013.01); *F01N 3/046* (2013.01); *F02F 1/36* (2013.01)

(58) Field of Classification Search
CPC ................................. F02B 41/10; B60K 13/04
USPC ................. 180/309; 60/604, 616; 123/41.31
See application file for complete search history.

(56) References Cited

U.S. PATENT DOCUMENTS

| | | | | |
|---|---|---|---|---|
| 4,107,927 A | * | 8/1978 | Gordon, Jr. ........... | F01D 25/125 417/407 |
| 4,608,827 A | * | 9/1986 | Hasegawa ................ | F01P 3/12 123/41.31 |
| 4,739,619 A | * | 4/1988 | Koerkemeier ............ | F01P 3/20 123/41.31 |
| 4,829,939 A | * | 5/1989 | Veenemans ............... | F01P 3/20 123/41.29 |
| 5,339,632 A | * | 8/1994 | McCrabb .............. | F01K 23/065 60/604 |
| 5,555,730 A | * | 9/1996 | Hope ...................... | F01B 9/023 123/41.73 |
| 5,653,108 A | * | 8/1997 | Hope ...................... | F01B 9/023 123/90.26 |
| 5,669,338 A | * | 9/1997 | Pribble ................... | F01P 7/165 123/41.29 |
| 5,794,445 A | * | 8/1998 | Dungner ............... | F01N 13/107 60/605.2 |

(Continued)

*Primary Examiner* — Jeffrey J Restifo
(74) *Attorney, Agent, or Firm* — Quinn IP Law

(57) ABSTRACT

An internal combustion engine includes a cylinder block defining a cylinder, a cylinder head, and an exhaust manifold operatively connected to the cylinder head and configured to exhaust post-combustion gasses from the cylinder. The engine also includes a turbocharger having a turbine housing and configured to be driven by the post-combustion gasses from the exhaust manifold, to pressurize an airflow being received from the ambient, and to discharge the pressurized airflow to the cylinder. The engine additionally includes a cooling module arranged between the turbine housing and the cylinder head and defining a third coolant jacket configured to cool the turbine housing. A vehicle employing such an engine is also disclosed.

20 Claims, 4 Drawing Sheets

(56) References Cited

U.S. PATENT DOCUMENTS

| | | | | |
|---|---|---|---|---|
| 5,937,651 A * | 8/1999 | Braun | F02B 37/005 | 60/605.2 |
| 6,041,602 A * | 3/2000 | Dickey | F02M 26/07 | 60/605.2 |
| 6,286,312 B1 * | 9/2001 | Bertilsson | F02B 29/0437 | 123/559.2 |
| 6,301,890 B1 * | 10/2001 | Zeretzke | F01K 23/065 | 60/597 |
| 6,390,081 B1 * | 5/2002 | Novak | F01P 11/16 | 123/676 |
| 8,424,303 B2 * | 4/2013 | Kardos | F01P 7/165 | 123/41.31 |
| 8,689,554 B2 * | 4/2014 | Espinosa | F01K 21/04 | 60/605.2 |
| 8,720,202 B2 * | 5/2014 | Stegmaier | F01N 5/02 | 60/605.2 |
| 9,021,808 B2 * | 5/2015 | Nelson | F02B 47/10 | 123/568.18 |
| 9,080,523 B1 * | 7/2015 | Ulrey | F02D 13/0242 | |
| 2002/0007636 A1 * | 1/2002 | Hay | F01K 23/065 | 60/618 |
| 2005/0045407 A1 * | 3/2005 | Bulicz | F01N 3/023 | 180/309 |
| 2009/0278360 A1 * | 11/2009 | Tateoka | F01D 15/10 | 290/1 A |
| 2010/0146967 A1 * | 6/2010 | Simpson | F02B 37/00 | 60/605.2 |
| 2011/0197582 A1 * | 8/2011 | Williams | F01N 5/02 | 60/604 |
| 2011/0209473 A1 * | 9/2011 | Fritz | F01K 23/065 | 60/605.2 |
| 2012/0055424 A1 * | 3/2012 | Kuhlbach | F02B 33/44 | 123/41.31 |
| 2013/0186088 A1 * | 7/2013 | Glover | F02G 5/04 | 60/616 |
| 2013/0283784 A1 * | 10/2013 | Uzkan | F01K 13/00 | 60/604 |
| 2013/0323021 A1 * | 12/2013 | Bogner | F01D 25/14 | 415/116 |
| 2014/0325981 A1 * | 11/2014 | Rabhi | F02B 37/164 | 60/600 |
| 2014/0331656 A1 * | 11/2014 | Nagar | F02B 75/28 | 60/297 |
| 2014/0360179 A1 * | 12/2014 | Doering | F02B 37/183 | 60/602 |
| 2015/0007800 A1 * | 1/2015 | Wade | F02C 6/12 | 123/568.14 |
| 2015/0034408 A1 * | 2/2015 | Wu | F02B 37/002 | 180/309 |
| 2015/0047606 A1 * | 2/2015 | Demura | F02D 41/0087 | 123/406.13 |
| 2015/0167494 A1 * | 6/2015 | Sumi | F01D 25/14 | 415/178 |
| 2015/0167592 A1 * | 6/2015 | Park | F01N 13/105 | 123/568.12 |
| 2015/0167595 A1 * | 6/2015 | Choi | F02M 25/0737 | 60/605.2 |
| 2015/0176477 A1 * | 6/2015 | Park | F01P 3/02 | 60/599 |
| 2015/0308364 A1 * | 10/2015 | Hojo | F02D 41/1439 | 60/285 |
| 2015/0337727 A1 * | 11/2015 | Fuqua | F01B 7/14 | 60/597 |
| 2016/0010594 A1 * | 1/2016 | Wu | F02M 25/071 | 60/602 |
| 2016/0102604 A1 * | 4/2016 | Wu | F02B 37/002 | 180/309 |
| 2016/0123278 A1 * | 5/2016 | McKay | F02M 25/0771 | 123/568.11 |
| 2016/0131046 A1 * | 5/2016 | Leone | F02B 37/004 | 60/600 |
| 2016/0131054 A1 * | 5/2016 | Ulrey | F02D 13/0246 | 60/600 |

* cited by examiner

ENGINE WITH A TURBOCHARGER COOLING MODULE

TECHNICAL FIELD

The present disclosure relates to a turbocharged internal combustion engine having a cooling module for the turbocharger.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

At higher engine speeds and loads, temperatures of engine exhaust gas generally become elevated. As a result, the engine's turbocharger assembly can experience substantial thermal stress that may require implementation of structural reinforcements and high-temperature materials to ensure reliable operation thereof.

SUMMARY

One embodiment of the disclosure is directed to an internal combustion engine that includes a cylinder block. The cylinder block defines a cylinder and a cylinder head mounted to the cylinder block. The cylinder head is configured to supply air and fuel to the cylinder for combustion therein. The engine also includes an exhaust manifold operatively connected to the cylinder head and configured to exhaust post-combustion gasses from the cylinder. The engine also includes a turbocharger having a turbine housing and configured to be driven by the post-combustion gasses from the exhaust manifold, to pressurize an airflow being received from the ambient, and to discharge the pressurized airflow to the cylinder. The engine additionally includes a cooling module arranged between the turbine housing and the cylinder head and defining a third coolant jacket configured to cool the turbine housing.

The exhaust manifold may be integrated into the cylinder head.

The turbocharger may include an inlet to the turbine housing and the third coolant jacket may be incorporated into the inlet to the turbine housing.

The cooling module may include an adapter for mounting the turbocharger to the exhaust manifold, wherein the adapter may define an exhaust flow passage connecting the exhaust manifold and the turbine housing.

The third coolant jacket may be configured to cool the exhaust flow passage.

The third coolant jacket may be in a parallel fluid path relative to the second coolant jacket.

The cooling module may include a coolant inlet and a coolant outlet. Each of the coolant inlet and the coolant outlet may be in fluid communication with the first coolant jacket.

The engine may also include a fluid control valve configured to selectively direct and block a flow of coolant through the third coolant jacket.

The engine may additionally include a temperature sensor configured to detect a temperature of the coolant in the third coolant jacket.

The engine may also include an electronic controller in electronic communication with each of the fluid control valve and the temperature sensor. The controller may be configured to regulate operation of the fluid control valve in response to the temperature detected by the temperature sensor.

Another embodiment of the present disclosure is directed to a vehicle employing the turbocharged internal combustion engine with the cooling module as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
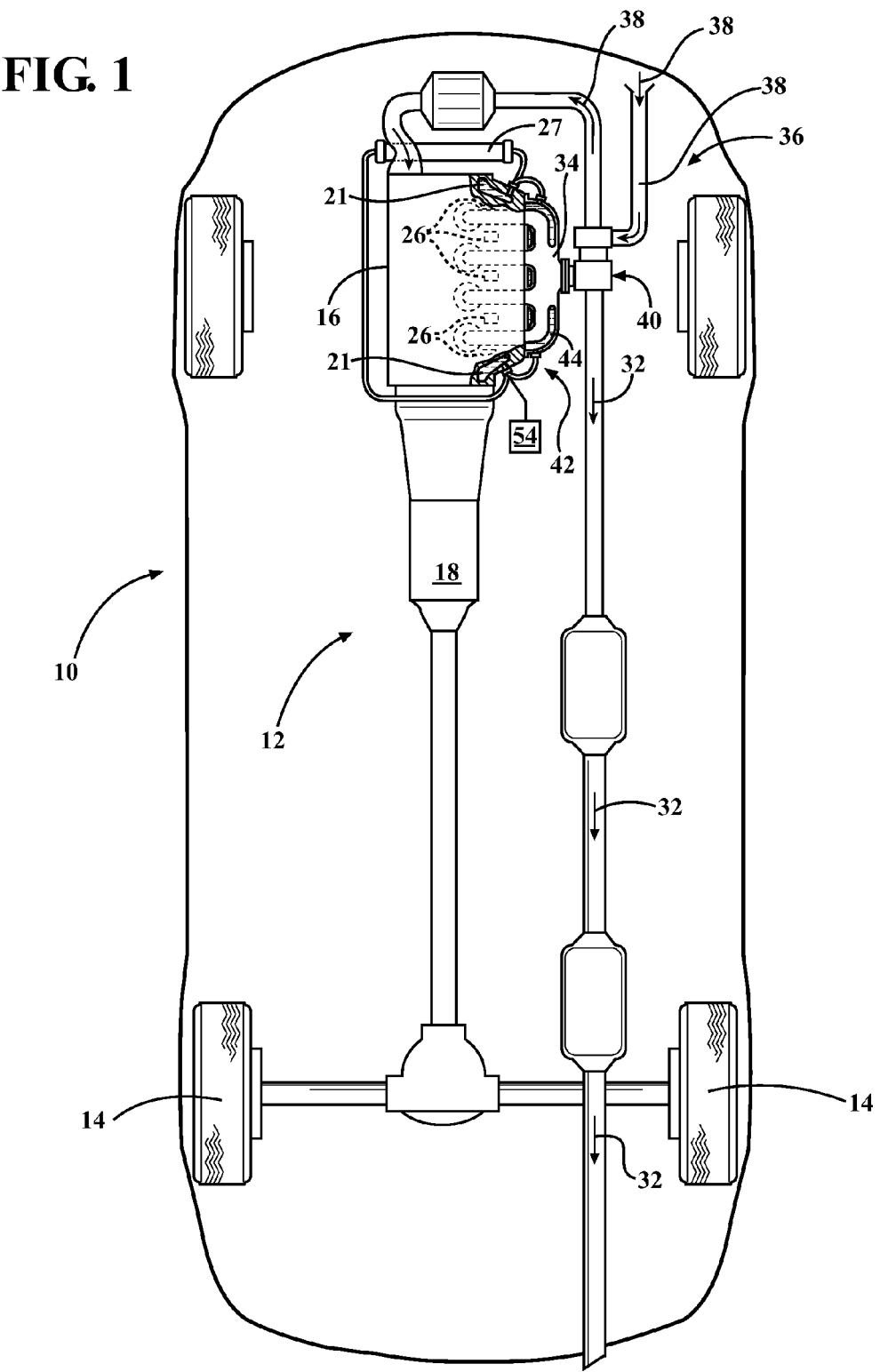
FIG. 1 is a schematic depiction of a vehicle having an engine with a turbocharger employing a cooling module according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may also include one or more electric motor/generators, none of which are shown, but the existence of which may be envisioned by those skilled in the art.

Figure 2:
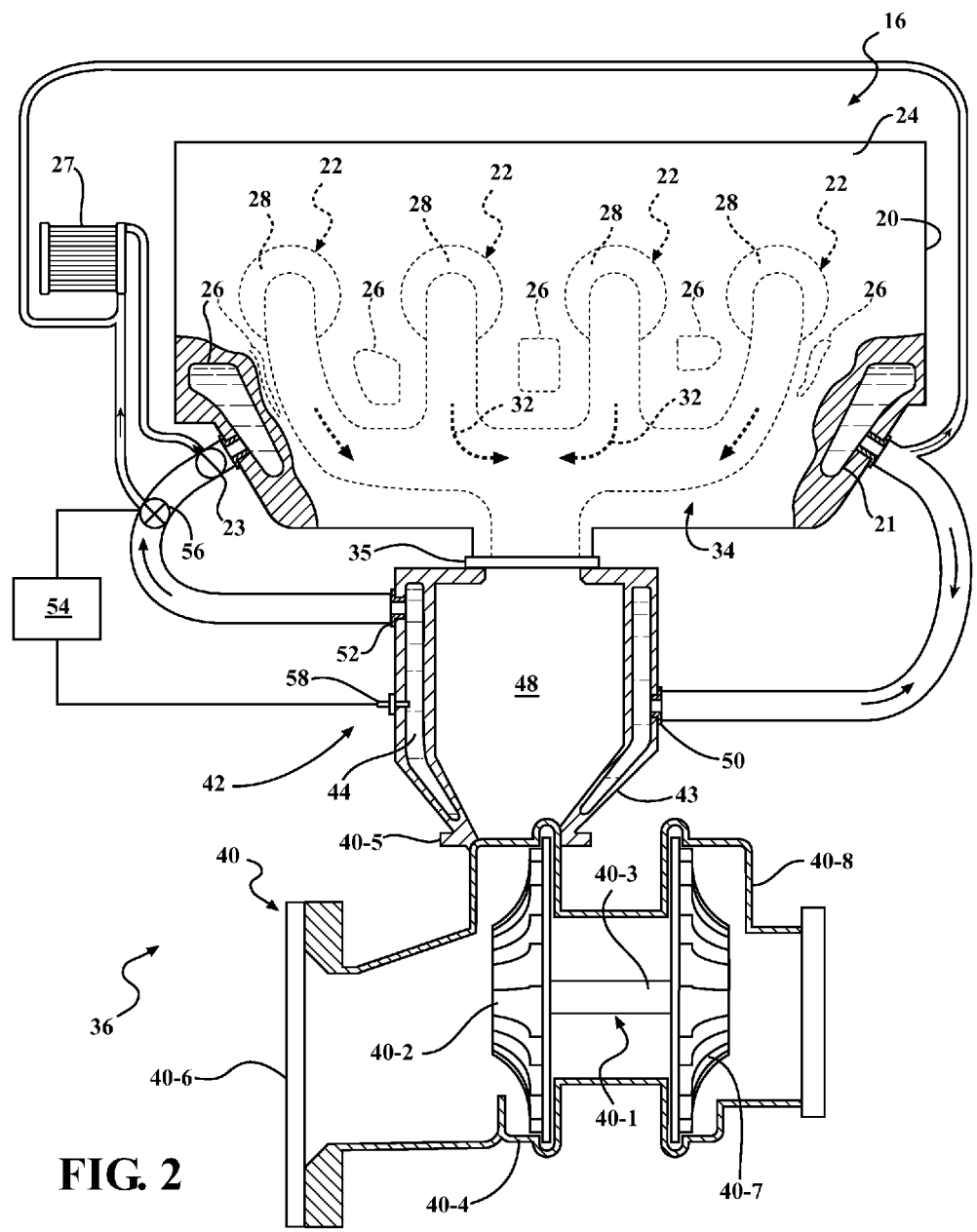
FIG. 2 is a schematic partially cross-sectional top view of an engine with the turbocharger and the cooling module shown in FIG. 1 according to one embodiment of the disclosure.
Figure 3:
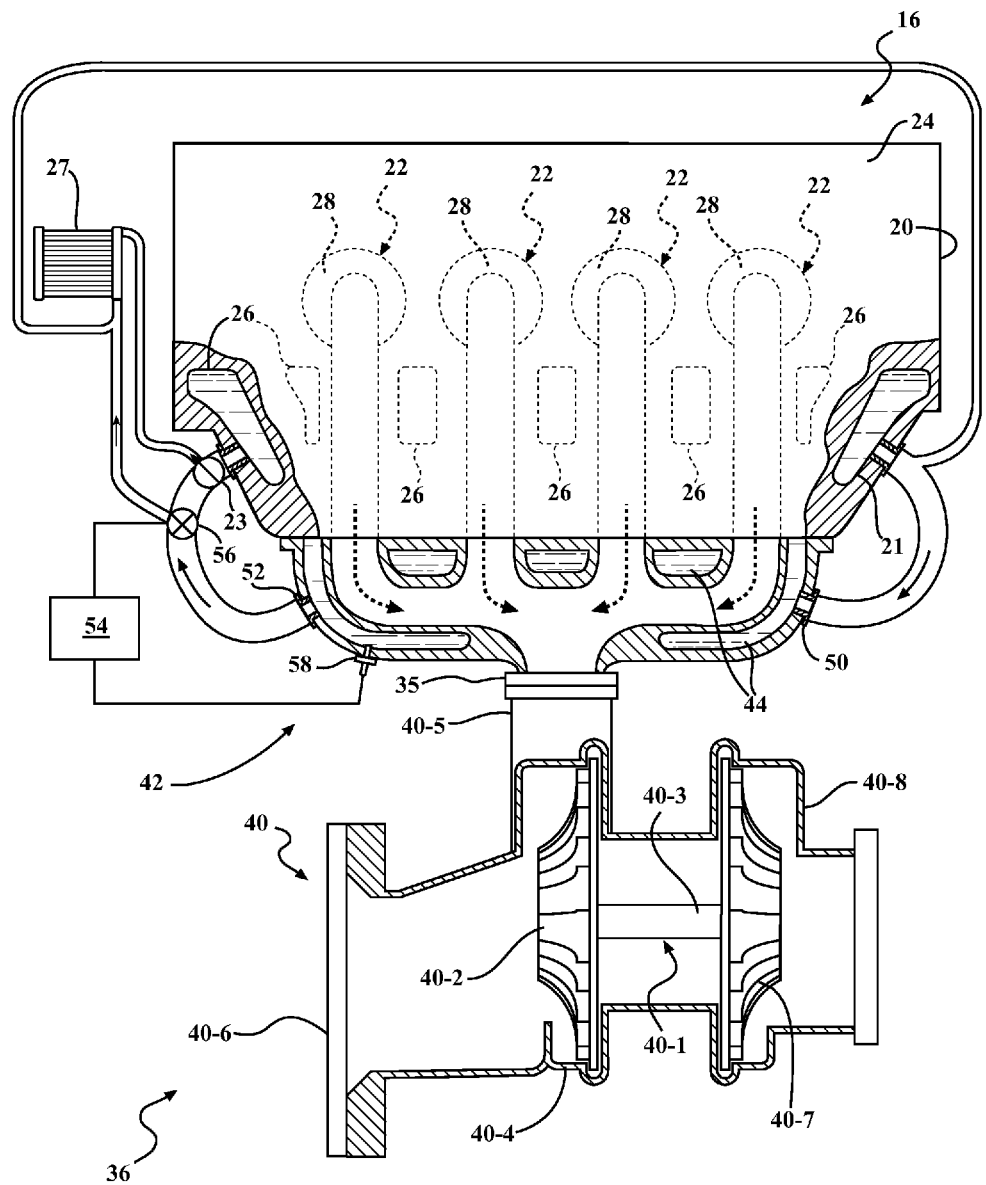
FIG. 3 is a schematic partially cross-sectional top view of the engine with the turbocharger and the cooling module shown in FIG. 1 according to another embodiment of the disclosure.
Figure 4:
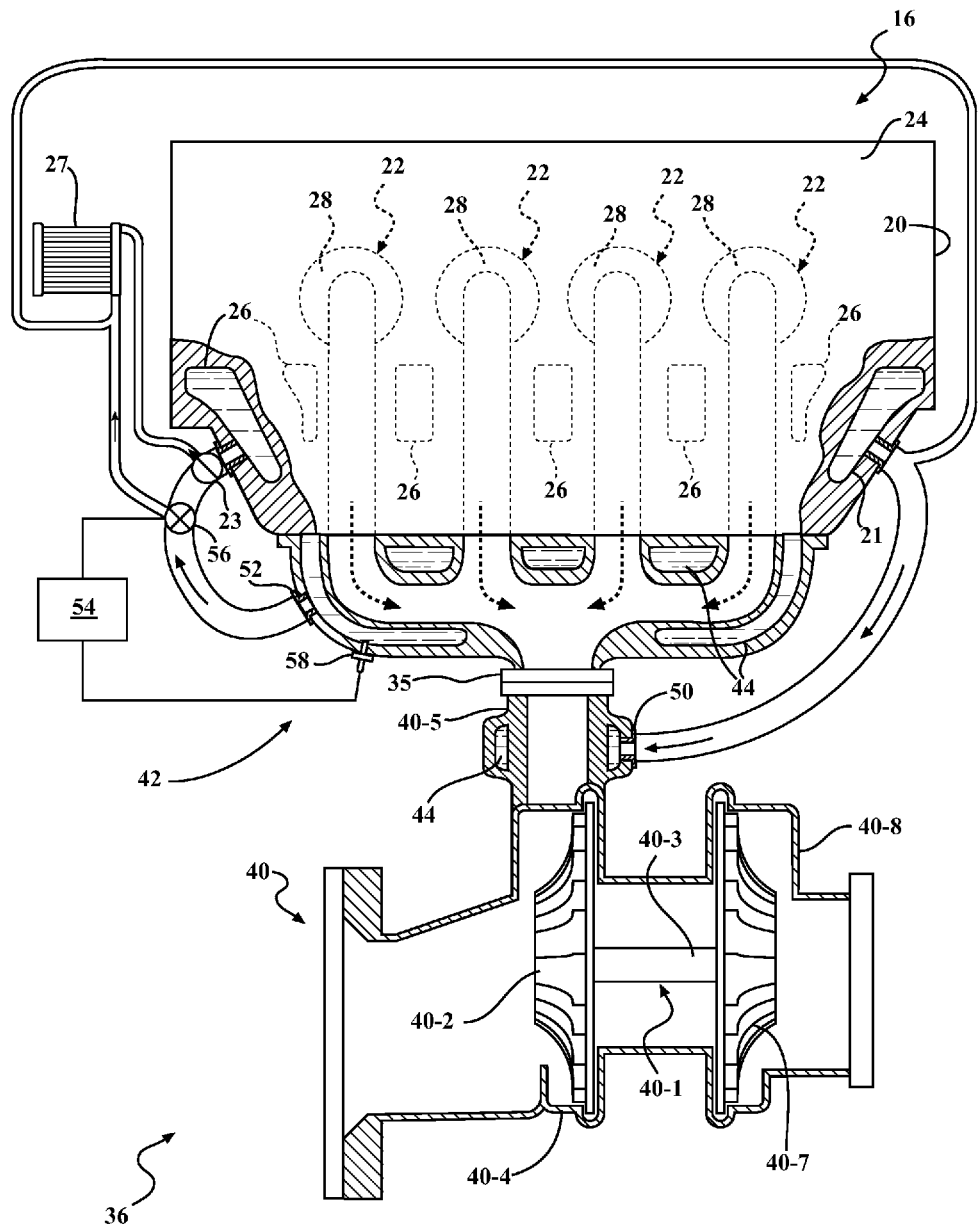
FIG. 4 is a schematic partially cross-sectional top view of the engine with the turbocharger and the cooling module shown in FIG. 1 according to yet another embodiment of the disclosure.

As shown in FIGS. 2-4, the engine 16 includes a cylinder block 20 with a plurality of cylinders 22 arranged therein and a cylinder head 24 that is mounted on the cylinder block. As shown in FIGS. 2-4, the cylinder block 20 defines a first coolant jacket 21 configured to circulate a specially formulated engine coolant therethrough. The engine coolant is typically circulated throughout the engine via either an electric or a mechanical fluid pump 23. The cylinder head 24 receives air and fuel to be used inside the cylinders 22 for subsequent combustion. In addition, the cylinder head 24 defines a second coolant jacket 26 configured to circulate the engine coolant therethrough. The engine coolant is typically passed through a heat exchanger 27, such as an air-to-coolant radiator, for removing heat energy that was carried away from the engine 16. After being passed through the heat exchanger 27, the engine coolant may be returned to the second coolant jacket 26 via the fluid pump 23.

Each cylinder 22 includes a piston, which is not specifically shown, but known to those skilled in the art to reciprocate therein. Combustion chambers 28 are formed within the cylinders 22 between the bottom surface of the cylinder head 24 and the tops of the pistons. As known by those skilled in the art, each of the combustion chambers 28 receives fuel and air from the cylinder head 24 that form a fuel-air mixture for subsequent combustion inside the subject combustion chamber. Although an in-line four-cylinder engine is shown, nothing precludes the present disclosure from being applied to an engine having a different number and/or arrangement of cylinders.

The engine 16 also includes a crankshaft (not shown) configured to rotate within the cylinder block 20. As known to those skilled in the art, the crankshaft is rotated by the pistons as a result of an appropriately proportioned fuel-air mixture being burned in the combustion chambers 28. After the air-fuel mixture is burned inside a specific combustion chamber 28, the reciprocating motion of a particular piston serves to exhaust post-combustion gasses 32 from the respective cylinder 22. As shown in FIGS. 2-4, the cylinder head 24 is also configured to exhaust post-combustion gasses 32 from the combustion chambers 28 via an exhaust manifold 34. The second coolant jacket 26 may be specifically configured to remove heat energy from the integrated exhaust manifold 34, as will be described in detail below.

As shown in FIG. 2, the exhaust manifold 34 may be internally cast, i.e., integrated, into the cylinder head 24, or, as shown in FIGS. 1, 3, and 4, may be configured as a separate, attachable component for scavenging the exhaust post-combustion gasses 32 from the cylinders 22. As shown in each of FIGS. 2-4, exhaust runners from different cylinders 22 may converge in the exhaust manifold 34 into an outlet 35. Although not shown, the exhaust runners from different cylinders 22 may be grouped in the exhaust manifold 34 to converge into two separate outlets.

The engine 16 also includes a turbocharging system 36 configured to develop boost pressure, i.e., pressurize an airflow 38 that is received from the ambient, for delivery to the cylinders 22. The turbocharging system 36 is configured as a forced induction arrangement for the engine 16. As shown in the Figures, the turbocharging system 36 includes a turbocharger 40. Although not shown, the turbocharging system 36 may also be configured as a two-stage, such as sequential or staged, system having two or more turbochargers similar to the turbocharger 40. The individual turbochargers of such a two-stage turbocharging system may be driven by the post-combustion gasses 32 from either the single exhaust manifold outlet 35 or from two separate outlets, as discussed above.

As shown in FIGS. 2-4, the turbocharger 40 includes a rotating assembly 40-1. The rotating assembly 40-1 includes a turbine wheel 40-2 mounted on a shaft 40-3. The turbine wheel 40-2 is configured to be rotated along with the shaft 40-3 by post-combustion gasses 32 emitted from the cylinders 22. The turbine wheel 40-2 is typically constructed from a temperature and oxidation resistant material, such as a nickel-chromium-based "inconel" super-alloy to reliably withstand temperatures of the post-combustion gasses 32. The turbine wheel 40-2 is disposed inside a turbine housing 40-4 that is typically constructed from cast iron or steel. The turbine housing 40-4 includes appropriately configured, i.e., designed and sized, respective turbine volutes or scrolls. The turbine scroll of the turbine housing 40-4 receives the post-combustion gasses 32 and directs the gasses to the turbine wheel 40-2.

The turbine scroll of the turbine housing 40-4 is configured to achieve specific performance characteristics, such as efficiency and response, of the turbocharger 40. At lower engine speeds the temperature of the post-combustion gasses entering the turbine housing 40-4 is typically below 1,560 degrees Fahrenheit. On the other hand, at higher speeds and loads the temperature of the post-combustion gasses 32 entering the turbine housing 40-4 may approach and even exceed 2,000 degrees Fahrenheit. The turbine housing 40-4 includes an inlet 40-5 and a respective outlet 40-6. The turbine housing 40-4 may also include an integrated wastegate valve (not shown) to facilitate more precise control over boost pressures generated by the turbocharger 40.

The rotating assembly 40-1 also includes a compressor wheel 40-7 mounted on the shaft 40-3. The compressor wheel 40-7 is configured to pressurize the airflow 38 being received from the ambient for eventual delivery to the cylinders 22. The compressor wheel 40-7 is disposed inside a respective compressor cover 40-8. The compressor cover 40-8 is typically constructed from aluminum and includes a respective compressor volute or scroll. As understood by those skilled in the art, the variable flow and force of the post-combustion gasses 32 influences the amount of boost pressure that may be generated by the compressor wheel 40-7 throughout the operating range of the engine 16. The compressor wheel 40-7 is typically formed from a high-strength aluminum alloy that provides the compressor wheel with reduced rotating inertia and quicker spin-up response.

The engine 16 also includes an induction system that may include an air duct and an air filter upstream of the turbocharger 40 configured to channel the airflow 38 from the ambient to the turbocharger. Although the induction system is not shown, the existence of such would be readily appreciated by those skilled in the art. The turbocharger 40 may also be fluidly connected to an intake manifold (not shown) that is configured to distribute the pressurized airflow 38 to each of the cylinders 22 for mixing with an appropriate amount of fuel and subsequent combustion of the resultant air-fuel mixture.

The engine 16 additionally includes a cooling module 42. The cooling module 42 is operatively connected to the turbine housing 40-4 in order to circulate the engine coolant proximately to the turbine housing. Specifically, the cooling module 42 is arranged between the turbine housing 40-4 and the cylinder head 24, and defines a third coolant jacket 44 configured to cool the turbine housing. The cooling module 42 removes heat energy from the post-combustion gasses 32 prior to such heat energy soaking into the turbine housing 40-4 in order to reduce operating temperature of the turbocharger 40. The reduction of operating temperatures of the turbocharger 40 may permit, among multiple benefits, enhanced durability of the turbine housing 40-4 and reduction in mass or grade of turbine housing materials, and/or employing a precision device, such as a variable geometry inlet mechanism, which is not shown, but known to those skilled in the art. The third coolant jacket 44 may be in fluid communication with each of the first coolant jacket 21 of the cylinder block 20 and the second coolant jacket 26 of the cylinder head 24.

As shown, the cooling module 42 may include an adapter 43 for mounting the turbocharger 40 to the exhaust manifold 34. The adapter 43 may be attached between the turbocharger 40 and the exhaust manifold 34, at the exhaust manifold outlet 35 and the turbine housing inlet 40-5, respectively, via appropriate fasteners, such as screws (not shown). The adapter 43 may be a cast component and the third coolant jacket 44 may then be cast into the adapter. As shown, the adapter 43 defines an exhaust flow passage 48 that connects the exhaust manifold and the turbine housing 40-4. In such a case, the third coolant jacket 44 may generally surround, i.e., be proximate to and at least partially wrap around, the exhaust flow passage 48 in order to cool the post-combustion gasses 32 flowing therethrough.

In an alternative embodiment of the cooling module 42 shown in FIGS. 1, 3, and 4, the cooling module may incorporate, such as cast, at least a part of third coolant jacket 44 into the structure of a separate attachable, i.e., non-integrated, exhaust manifold 34 in order to remove the heat energy from the post-combustion gasses 32 prior to their entry into the turbine housing 40-4. In yet another embodiment of the cooling module 42 shown specifically in FIG. 4, the cooling module may incorporate, such as cast, at least a part of third coolant jacket 44 into the inlet 40-5 of the turbine housing 40-4 in order to remove the heat energy from the post-combustion gasses 32 at the entry to the turbine housing. In all the shown embodiments, all the individual parts of the third coolant jacket 44 are intended to be fluidly interconnected such that the engine coolant may circulate through all the respective parts of the third coolant jacket. Thus, the operating temperature of the turbine housing 40-4 may be reduced via circulation of the engine coolant through the third coolant jacket 44 incorporated into the exhaust manifold 34 and/or at the inlet 40-5 of the turbine housing.

As shown in FIGS. 2-4, the cooling module 42 also includes a coolant inlet 50 and a coolant outlet 52. Each of the coolant inlet 50 and the coolant outlet 52 may be in fluid communication with the second coolant jacket 26 in the cylinder head 24. Accordingly, the engine coolant may be circulated through the cooling module 42 via the second coolant jacket 26 to the coolant inlet 50 and back to the second coolant jacket 26 via the coolant outlet 52. During operation of the turbocharging system 36, such coolant circulation can continuously remove heat energy from the post-combustion gasses 32 to reduce operating temperature of the turbine housing 40-4. The third coolant jacket 44 is arranged in a series fluid path with the first coolant jacket 21. Additionally, the third coolant jacket 44 is arranged fluidly in parallel with, i.e., in a parallel fluid path relative to, the second coolant jacket 26. Accordingly, the second coolant jacket 26 may receive one portion of the engine coolant from the first coolant jacket 21, while the third coolant jacket 44 may receive another portion of the engine coolant from the first coolant jacket.

The vehicle 10 may also include a programmable controller 54 configured to regulate operation of the engine 16, such as by controlling an amount of fuel being injected into the cylinders 22 for mixing and subsequent combustion with the pressurized airflow 38. The controller 54 is also configured to regulate the circulation of engine coolant between the first and second coolant jackets 21, 26. Additionally, the controller 54 may regulate the circulation of engine coolant through the third coolant jacket 44 of the cooling module 42 in response to the duty cycle of the turbocharger 40, and depending on operating parameters, such as the load, temperature, and rotational speed, of the engine 16. Such regulation of the coolant circulation may be accomplished via a fluid control valve 56 (shown in FIGS. 2-4) configured to selectively direct and block the flow of engine coolant through the third coolant jacket 44. The fluid control valve 56 will be described in greater detail below.

In general, the controller 54 may be a dedicated controller for the engine 16, a controller for the powertrain 12, or a central processing unit for the entire vehicle 10. The controller 54 includes a memory, at least some of which is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 54 may also include a floppy disk, a flexible disk, hard disk, magnetic tape, any other magnetic medium, a CD-ROM, DVD, any other optical medium, etc. The controller 54 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 54 or accessible thereby may be stored in the memory and automatically executed to provide the required functionality.

The controller 54 may be programmed to regulate operation of the fluid control valve 56 in response to operating conditions of the engine 16. As shown in FIGS. 2-4, the fluid control valve 56 controls the flow of engine coolant between the fluid pump 23 and the heat exchanger 27. The fluid control valve 56 may be arranged in the cooling module 42 between the coolant outlet 52 and the fluid pump 23 in order to control the flow of engine coolant between the first fluid jacket 21 and the fluidly parallel second and third coolant jackets 26, 44. The fluid control valve 56 may be a multi-position device that can inhibit the flow of engine coolant through the third coolant jacket 44 in a first mode; permit the engine coolant to flow through the third coolant jacket 44 and through the fluid pump 23 back toward the first coolant jacket 21 in a second mode; and permit the engine coolant to flow through the third coolant jacket 44 and to the heat exchanger 27 in a third mode.

During warm-up of the engine 16, when the heat load on the cooling module 42 is low, the fluid control valve 56 may be kept closed in the first mode to prevent engine coolant from flowing into the third coolant jacket 44. As the engine 16 warms up, and the heat load on the cooling module 42 increases, the fluid control valve 56 may be opened in the second mode to permit the engine coolant to flow through the third coolant jacket 44 to the fluid pump 23 and back toward the first coolant jacket 21. Under load, when the engine 16 is propelling the vehicle 10 and the turbocharger 40 is generating boost, both the cylinder block 20 and the cooling module 42 may heat up sufficiently to require engine coolant flow and heat rejection to the heat exchanger 27. Accordingly, in a situation where coolant flow is needed to maintain a target operating temperature in the cylinder block 20, the controller 54 can command the fluid control valve 56 to open in the third mode and permit the coolant to flow through the third coolant jacket 44, to the heat exchanger 27, and then to the fluid pump 23. When opened in either the second or third modes, the fluid control valve 56 will allow the coolant to flow through each of the first coolant jacket 21, the second coolant jacket 26, and the third coolant jacket 44.

As shown in FIGS. 2-4, a temperature sensor 58 may be used to detect temperature of the engine coolant in the third coolant jacket 44 and communicate the detected temperature to the controller 54. Under some conditions the turbocharger 40 may require being cooled before cooling of the cylinder block 20. In such a situation, the fluid control valve 56 may be opened by the controller 54 to operate the control valve 56 in any of the second and third modes in response to the temperature detected by the temperature sensor 58.

Additional benefits of the above-disclosed system may be an expanded range of Lambda ($\lambda$)=1.0 operation of the engine 16, i.e., engine operation at stoichiometric air-fuel ratio, thus facilitating improved engine fuel economy. The resultant reduction in exhaust gas temperatures can provide improved durability for various engine components, such as exhaust valves (not shown) and the exhaust manifold 34, especially if the exhaust manifold is a separate, attachable component that is not integrated into the cylinder head 24, which may, in turn, permit use of less costly materials for those and other related components. Also, the mass of turbine housing 40-4 may be decreased, thus reducing cold-start emissions of the engine 16.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   a cylinder block defining a cylinder and a first coolant jacket;
   a cylinder head mounted to the cylinder block and configured to supply air and fuel to the cylinder for combustion therein, and defining a second coolant jacket;
   an exhaust manifold operatively connected to the cylinder head and configured to exhaust post-combustion gasses from the cylinder;
   a turbocharger having a turbine housing and configured to be driven by the post-combustion gasses from the exhaust manifold, to pressurize an airflow being received from the ambient, and to discharge the pressurized airflow to the cylinder; and
   a cooling module arranged between the turbine housing and the cylinder head and defining a third coolant jacket configured to remove heat energy from the post-combustion gasses prior to the heat energy soaking into the turbine housing.

2. The engine of claim 1, wherein the exhaust manifold is integrated into the cylinder head.

3. The engine of claim 1, wherein the turbocharger includes an inlet for the post-combustion gasses into the turbine housing and the third coolant jacket is incorporated into the inlet of the turbine housing.

4. The engine of claim 1, wherein the cooling module includes an adapter for mounting the turbocharger to the exhaust manifold, and wherein the adapter defines an exhaust flow passage connecting the exhaust manifold and the turbine housing.

5. The engine of claim 4, wherein the third coolant jacket is configured to cool the exhaust flow passage.

6. The engine of claim 1, wherein the third coolant jacket is in a parallel fluid path relative to the second coolant jacket.

7. The engine of claim 1, wherein the cooling module includes a coolant inlet and a coolant outlet, and wherein each of the coolant inlet and the coolant outlet is in fluid communication with the first coolant jacket.

8. The engine of claim 1, further comprising a fluid control valve configured to selectively direct and block a flow of coolant through the third coolant jacket.

9. The engine of claim 8, further comprising a temperature sensor configured to detect a temperature of the coolant in the third coolant jacket.

10. The engine of claim 9, further comprising an electronic controller in electronic communication with each of the fluid control valve and the temperature sensor, and configured to regulate operation of the fluid control valve in response to the temperature detected by the temperature sensor.

11. A vehicle comprising:
    a driven wheel; and
    a powertrain including an internal combustion engine and a transmission assembly operatively connected to the engine and configured to transmit engine torque to the driven wheel, the engine including:
      a cylinder block defining a cylinder and a first coolant jacket;
      a cylinder head mounted to the cylinder block and configured to supply air and fuel to the cylinder for combustion therein, and defining a second coolant jacket;
      an exhaust manifold operatively connected to the cylinder head and configured to exhaust post-combustion gasses from the cylinder; and
      a turbocharger having a turbine housing and configured to be driven by the post-combustion gasses from the exhaust manifold, to pressurize an airflow being received from the ambient, and to discharge the pressurized airflow to the cylinder; and
      a cooling module arranged between the turbine housing and the cylinder head and defining a third coolant jacket configured to remove heat energy from the post-combustion gasses prior to the heat energy soaking into the turbine housing.

12. The vehicle of claim 11, wherein the exhaust manifold is integrated into the cylinder head.

13. The vehicle of claim 11, wherein the turbocharger includes an inlet for the post-combustion gasses into the turbine housing and the third coolant jacket is incorporated into the inlet of the turbine housing.

14. The vehicle of claim 11, wherein the cooling module includes an adapter for mounting the turbocharger to the exhaust manifold, and wherein the adapter defines an exhaust flow passage connecting the exhaust manifold and the turbine housing.

15. The vehicle of claim 14, wherein the third coolant jacket is configured to cool the exhaust flow passage.

16. The vehicle of claim 11, wherein the third coolant jacket is in a parallel fluid path relative to the second coolant jacket.

17. The vehicle of claim 11, wherein the cooling module includes a coolant inlet and a coolant outlet, and wherein each of the coolant inlet and the coolant outlet is in fluid communication with the second coolant jacket.

18. The vehicle of claim 11, further comprising a fluid control valve configured to selectively direct and block a flow of coolant through the third coolant jacket.

19. The vehicle of claim 18, further comprising a temperature sensor configured to detect a temperature of the coolant in the third coolant jacket.

20. The vehicle of claim 19, further comprising an electronic controller in electronic communication with each of the fluid control valve and the temperature sensor, and configured to regulate operation of the fluid control valve in response to the temperature detected by the temperature sensor.

* * * * *